United States Patent [19]
Sun

[11] Patent Number: 5,285,680
[45] Date of Patent: Feb. 15, 1994

[54] GOLF CLUB MEASURING APPARATUS AND METHOD

[76] Inventor: Donald J. C. Sun, 4251 Ocean Valley La., San Diego, Calif. 93130

[21] Appl. No.: 956,073

[22] Filed: Oct. 2, 1992

[51] Int. Cl.⁵ .................... G01M 1/00; A63B 53/00
[52] U.S. Cl. ................................ 73/65.03; 73/65.01
[58] Field of Search .................... 73/65.03, 65.01; 273/80 A

[56] References Cited

U.S. PATENT DOCUMENTS

| | | | |
|---|---|---|---|
| 2,727,384 | 12/1955 | Brandon | 73/65.03 |
| 4,043,184 | 8/1977 | Sayers | 73/65.03 |
| 4,603,577 | 8/1986 | Johnson et al. | 73/65.03 |
| 5,094,101 | 3/1992 | Chastonay | 73/65.03 |

*Primary Examiner*—Donald O. Woodiel
*Assistant Examiner*—R. Biegel
*Attorney, Agent, or Firm*—William W. Haefliger

[57] ABSTRACT

An apparatus for determining the length and swing weight of a golf club having a shaft and a head, the head having a sole, there being a top at the end of the shaft remote from the head comprising a longitudinally lengthwise elongated frame; first structure on the frame for supporting the club shaft to extend generally longitudinally; second structure on the frame to contact the shaft top at a first locus and to contact the head sole at a second locus, whereby the club length "l" can be measured between the first and second loci; and third structure adjustably movable relative to the frame to support the shaft at a third locus proximate the determinate center of gravity of the golf club.

13 Claims, 2 Drawing Sheets

GOLF CLUB MEASURING APPARATUS AND METHOD

BACKGROUND OF THE INVENTION

This invention relates generally to golf club measurement, and particularly to simple, effective apparatus by which shaft length and swing weight can be determined. Swing weight is an apparent weight related to the centrifugal force felt by the hands of the golfer swinging the club.

For a golf club, besides its total weight, there are two important and considerable properties, i.e., the length and swing weight. The traditional standard for measuring the length of a club is the distance from the back heel portion of the sole radius to the top of the cap at the end of the shaft. But the best and most accurate method for measuring a golf club is the distance from the top of the cap, along the central line or the axis of the shaft, to the intersection with the sole surface, as at the horizontal ground plane at address position. The latter method eliminates the effect of sole heel radius. Because the length of a club influences its swing weight, the method of measuring length of a club becomes critical.

The common, non-technical definition of swing weight is the measure of a golf club's weight distribution about a fulcrum point, which is established at a specified distance from the grip end of the club. This still does not provide an exact definition. For an exact and meaningful definition, swing weight is an apparent weight or the centrifugal force felt by the golfer's hands who swings it.

There is need for apparatus by which a golf club can be measured, to enable easy determination of swing weight and length.

SUMMARY OF THE INVENTION

It is a major object of the invention to provide simple, effective, easily used apparatus to meet the above needs.

The apparatus of the invention is usable in conjunction with a golf club having a shaft and a head, the head having a sole, and the shaft having a top, as for example on a cap. Such apparatus basically comprises:

a) a longitudinally lengthwise elongated frame, b) first means on the frame for supporting the club shaft to extend generally longitudinally, c) second means on the frame to contact the shaft top at a first locus and to contact the head sole at a second locus, whereby the club length "1" can be measured between the first and second loci, d) and third means adjustably movable relative to the frame to support the shaft at a third locus proximate the determinate center of gravity of the golf club.

As will appear, fourth means may be provided, to include a weight indicator, to indicate weight "w" applied at the third locus, whereby the club swing weight is equal to w · (d−c), where c is a constant, and d is the distance between the first and third loci.

It is another object to provide the referenced first means in the form of two shaft supports spaced apart in the length direction of the shaft to engage and support the shaft for length measurement; and those two supports may have upwardly opening notches to receive the shaft placed into position to be contacted by the second means; and the third means, which determines center of gravity, may be located endwise between the two notched supports.

It is a further object to provide the referenced third means to include a support adjustably movable along the frame in the length direction of the shaft, and a shaft-engaging edge carried by the support; and the fourth means may then include a spring upon which club weight is imposed to yieldably deflect the spring, and a weight indicator associated with the spring. The weight indicator may include a scale, as will be seen.

Yet another object is to provide the second means in the form of a first adjustable contact element to engage the cap top, and a second adjustable contact element to engage the head sole, these elements spaced apart in the length direction of the shaft. In this regard, the second contact element preferably has pivoted connection to the frame, whereby the second locus can be adjustably shifted along the head sole between the head, toe and heel. In addition, the first contact element may be carried for movement lengthwise of the frame, as by elongated support means having slidable telescopic interfit with the frame; and a scale may be associated with that elongated support means to indicate club length.

These and other objects and advantages of the invention, as well as the details of an illustrative embodiment, will be more fully understood from the following specification and drawings, in which:

DRAWING DESCRIPTION

DETAILED DESCRIPTION

Figure 1:
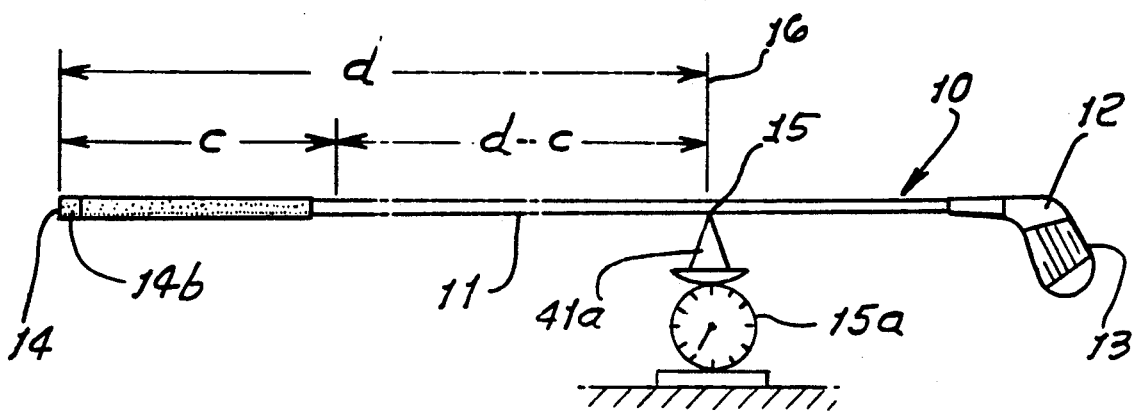
FIG. 1 is a schematic view showing swing weight calculation.
Figure 2:
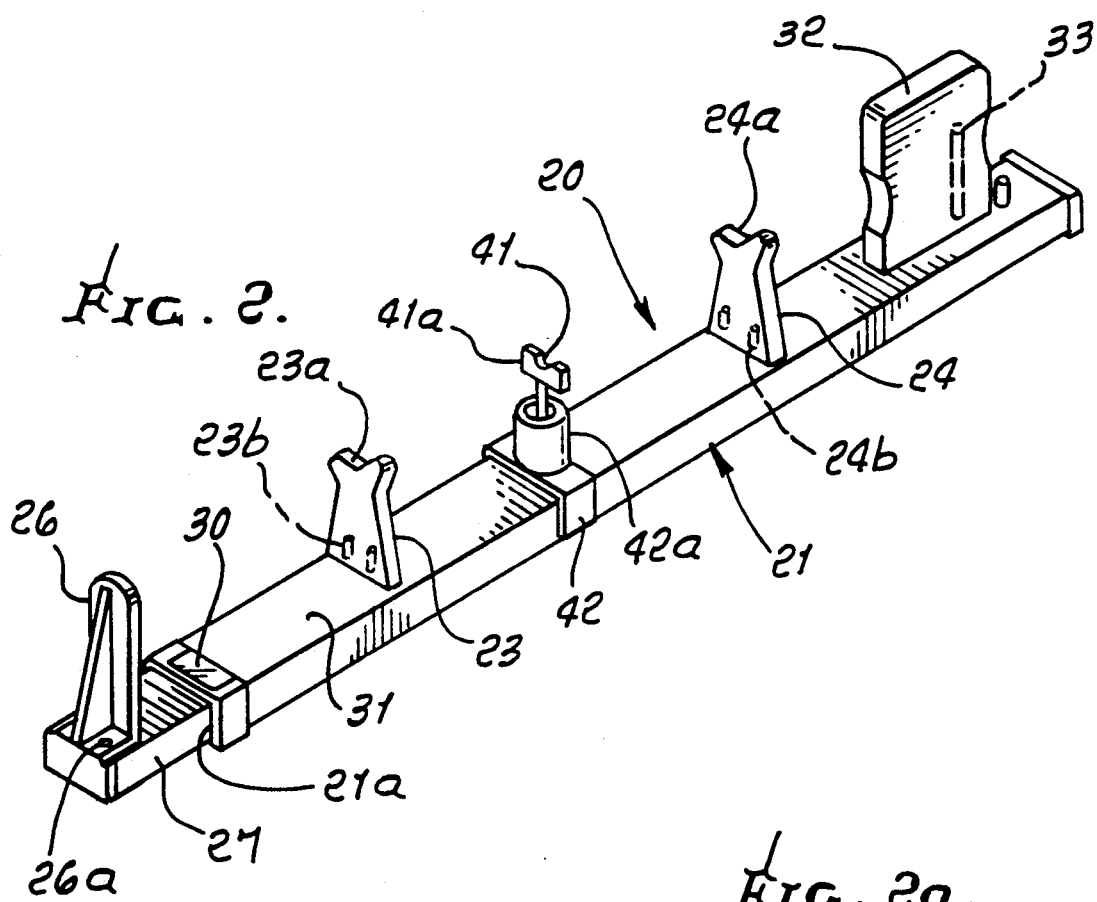
FIG. 2 is a perspective view showing construction of apparatus embodying the invention.
Figure 2A:
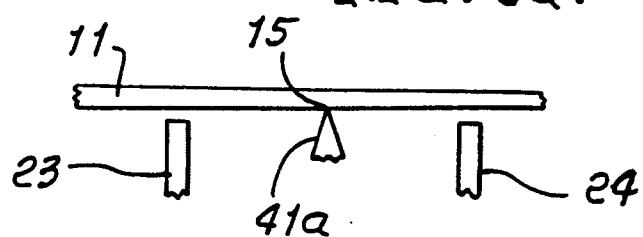
FIG. 2a is a schematic drawing.
Figure 3:
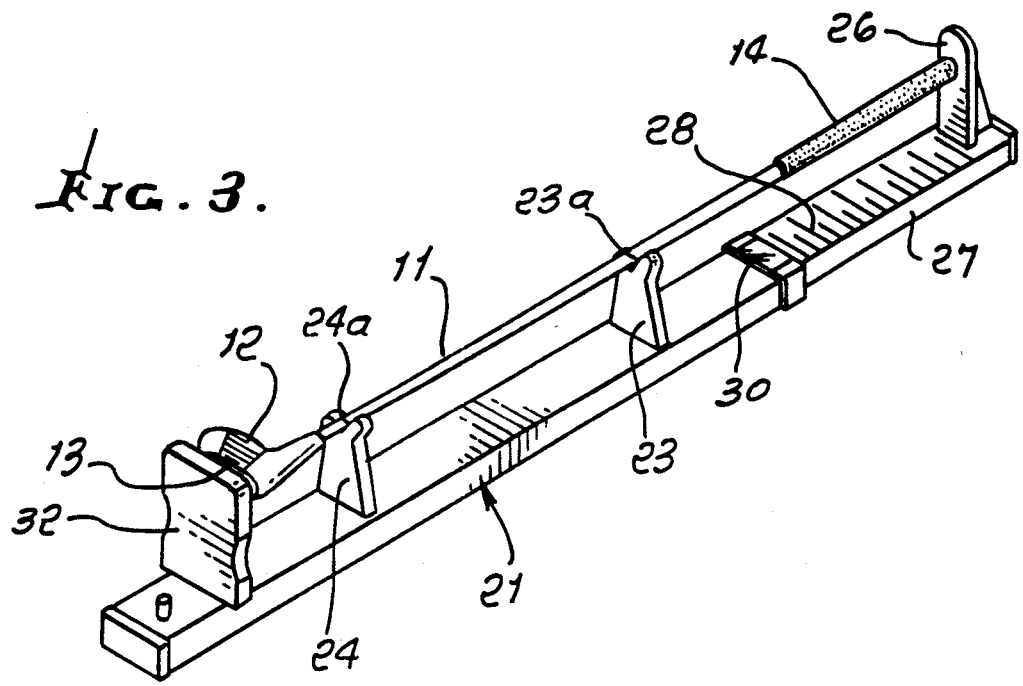
FIG. 3 is a schematic perspective showing golf club length measurement.

Referring first to FIG. 1, a golf club 10 has a shaft 11, a head 12, a head sole 13, and a top 14 at the end of the shaft. The shaft is positioned on a knife edge 15 above a scale 15a, so that the shaft and head are in balance, i.e., the shaft does not tilt downwardly to either side of the knife edge. The club balance point is at 16. The weight of the golf club is then read on the scale, as represented by the symbol "w". Also the length "d" of the shaft 11, between the balance point 16 and the top 14, is determined. The swing weight "sw" of the club is then calculated as w · (d−c inches), in inch-ounces. Value "c" is typically 14 inches for a set of clubs Referring to FIG. 2, apparatus 20 is shown for obtaining the values "d" and "w". It includes a longitudinally lengthwise elongated frame or bar 21. First means may be provided on the frame for supporting the club shaft, to extend generally longitudinally. See also FIG. 3 showing the shaft 11 resting on two shaft supports 23 and 24, having longitudinally aligned, V-shaped downward notches 23a and 24a to receive and position the shaft to extend longitudinally. Supports 23 and 24 are attached at 23b and 24b to the frame.

Second means is also provided on the frame to contact the top 14 of the club (as for example the top of a cap 14b on the end of the shaft), at a first locus, and to contact the head sole 13 at a second locus, whereby the club length "1" can be measured between the first and second loci. Note that such second means typically includes an upright 26, fixed in position at 26a on a slider member 27, telescopically slidable in an opening 21a in the frame. Upright 26 provides a first adjustable contact element (i.e., to contact top 14) for adjustable movement lengthwise of the frame. A scale 28 is provided on the slider 27, and club length numbers (inches) may be provided on the scale, and thus are visible through a window 30 in the frame top wall 31, whereby club length is readily ascertainable.

Figure 4:
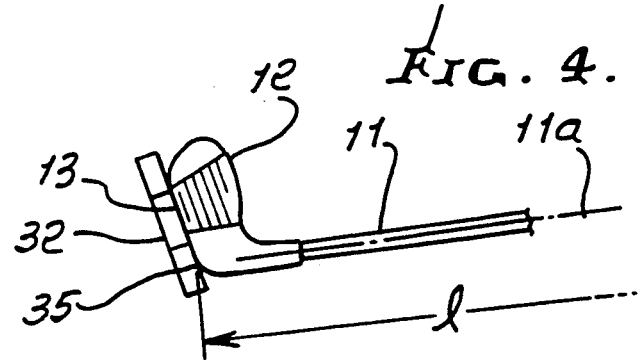
FIG. 4 is a fragmentary elevation showing head positioning in the FIG. 2 apparatus.

A second contact element is provided by the pivoted plate 32 flatly engageable with the club head sole 13, as seen in FIG. 3, and as also represented in FIG. 4. Pivoting of the plate 32 about the upright axis of a pin 33 attached to the frame allows the plate to conform to differently shaped and located soles, on different club heads. In this way, the club length to the point 35 on the sole is determined, point 35 located at the intersection of the shaft axis 11a with the sole. The plate 32 may be rotatably biased on a torsion spring associated with the pin, so that the plate tends to return to FIG. 2 position, and the plate is then self-biased against the sole in FIG. 4. The scale 28 is calibrated to read the club length between sole point 35 and the top or end 14 of the shaft.

Figure 5:
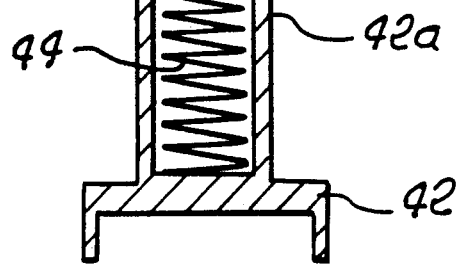
FIG. 5 is an enlarged elevation showing use of a spring during club weighing.

Also provided, in association with the frame, is third means adjustably movable relative to the frame, i.e., lengthwise thereof, to a third locus proximate the determinate center of gravity, i.e., at the balance point, of the golf club. See for example the downwardly notched knife edge 41 on a support 41a in FIGS. 2 and 5.

A clip 42 on the lower end of a support 42a embraces the frame 21 and allows adjustment shifting of the support and knife edge 40, longitudinally to the balance point. The notched knife edge is movable vertically into alignment with notches 23a and 24a. A spring 44 in or on the support 42a urges the knife 41a upwardly via post 47; and when manually released from depressed position of edge 40, it lifts the shaft 11 above the levels of the fixed notches 23a and 24a, so that full weight of the shaft bears on the spring. A scale 46 on the post 47, between the spring and the knife 41a, is calibrated to read the club weight in ounces, i.e., adjacent edge 48 on the support. The shaft is then supported at a third locus proximate the center of gravity of the club. The length "d" between the balance point and the end 14 of the shaft can then be measured, and the swing weight value, $w \cdot (d-c)$ inch-ounce, determined.

In this regard, "14 inches" in the calculation agrees with the prorythmic swingweight scale, the worldwide system, incorporated by reference herein, or can be regarded as one value for a constant "c" in the more general formula: $w \cdot (d-c)$. The constant "c" may have different values for different golf club sets, but should be the same for all clubs in a set.

I claim:

1. In apparatus for determining the length and swing weight of a golf club having a shaft and a head, the head having a sole, there being a top at the end of the shaft remote from the head, the combination comprising:
    a) a longitudinally lengthwise elongated frame,
    b) first means on the frame for supporting the club shaft to extend generally longitudinally,
    c) second means on the frame to contact the shaft top at a first locus and to contact the head sole at a second locus, whereby the club length "l" can be measured between said first and second loci,
    d) and third means adjustably movable relative to the frame to support the shaft at a third locus promixate the determine center of gravity of the golf club,
    e) fourth means associated with said third means to indicate the total weight "w" of the golf club imposed at said center of gravity, whereby the swing weight of the golf club can be determined as a function of "d" and "w", where d is the distance between said first locus and said third locus,
    f) said second means including a first adjustable contact element to engage said top, and a second adjustable contact element to engage the head sole, said elements spaced apart in the length direction of the shaft,
    g) support means carrying said first adjustable contact element for movement lengthwise of said frame,
    h) said frame and said support means having slidable telescopic interfit,
    i) said fourth means including a weighing spring carried by and above the frame.

2. The combination of claim 1 wherein said fourth means includes a weight indicator, whereby said swing weight is equal to:

$$w \cdot (d-c)$$

where c is a constant, or has the value 14 inches.

3. The combination of claim 1 wherein said first means comprises two shaft supports carried by the frame and spaced apart in the length direction of the shaft to engage and support the shaft.

4. The combination of claim 3 wherein said two supports have upwardly opening notches to receive the shaft placed into position to be contacted by said second means at said first and second loci.

5. The combination of claim 4 wherein said third means is located endwise between said two supports.

6. The combination of claim 1 wherein said second adjustable contact element has pivoted connection to the frame, whereby said second locus can conform to the position of the head sole between the head toe and heel.

7. The combination of claim 1 including a scale extending on said support means to indicate the club's length "1", said support means including a slider member movable relative to and within said frame.

8. The combination of claim 1 wherein said third means includes a support adjustably movable along the frame in the length direction of the shaft, and a shaft-engaging edge carried by said support.

9. The combination of claim 8 wherein said fourth means includes a weight indicator associated with the spring.

10. The combination of claim 9 wherein said spring is located in alignment with said edge.

11. The combination of claim 10 wherein said spring is carried by said support.

12. The combination of claim 1 wherein said fourth means includes a weight indicator associated with the spring.

13. The combination of claim 12 wherein said weight indicator comprises a scale.

* * * * *